J. B. SWEETLAND.
CORN HARVESTER.
No. 74,447                      Patented Feb. 11, 1868.
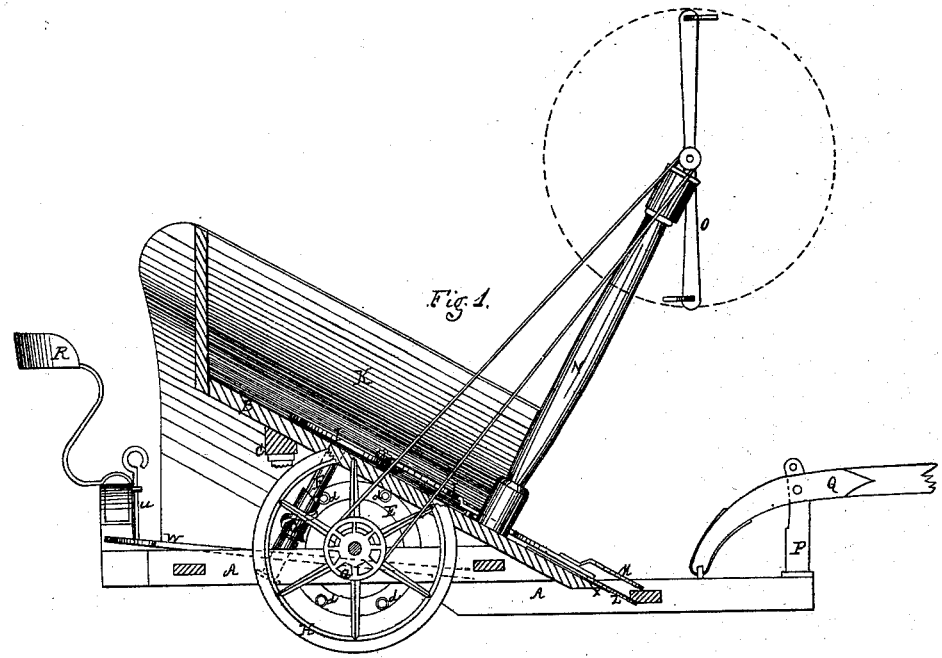
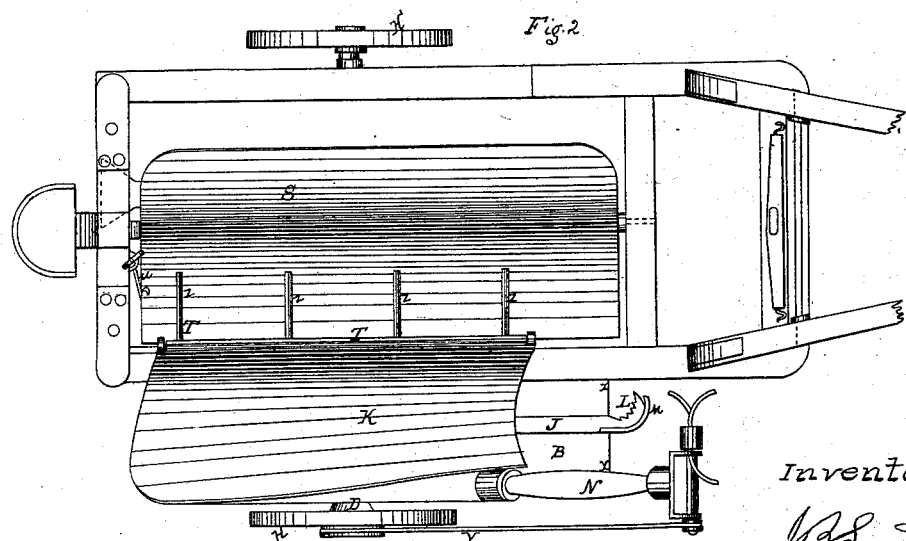
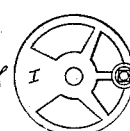
Witnesses                    Inventor

United States Patent Office.

JEROME B. SWEETLAND, OF PONTIAC, MICHIGAN.

Letters Patent No. 74,447, dated February 11, 1868.

IMPROVEMENT IN CORN-HARVESTERS.

*The Schedule referred to in these Letters Patent and making part of the same.*

TO ALL WHOM IT MAY CONCERN:

Be it known that I, JEROME B. SWEETLAND, of Pontiac, in the county of Oakland, and in the State of Michigan, have invented a new and useful Improvement in Corn-Harvester; and do hereby declare that the following is a full, clear, and exact description thereof, reference being had to the accompanying drawings, and to the letters of reference marked thereon.

In the annexed drawings, making part of this specification, A represents the frame of the machine, which is supported upon two wheels, H and H'. These wheels are placed upon short axles on each side of the frame. D represents one of these axles. Upon the right side of the frame A is an inclined platform, B. This platform rests at its forward end upon the frame, but is raised above it at its rear end, and supported upon standards C. Near the rear end of the platform is a shaft, F, which is placed at right angles to said platform, and beneath it, having one bearing in a cross-piece in the frame, and its upper one in the platform. Surrounding this shaft is a collar or sleeve, G, and upon its upper end is a balance-wheel, I. Upon the outside of the sleeve G is formed a long screw-thread. This sleeve slides upon the shaft, and is provided with a shoulder upon its upper end, which catches against a pin upon the shaft, for stationing it when desirable. On the axle D is a wheel, E, whose hub is so arranged that, while it will not turn upon said axle, it will slide upon it. A lever, W, is so arranged and connected to the hub of this wheel that it causes it to slide upon the axle B, for throwing it in and out of gear. Upon one face of wheel E, near its periphery, is a series of pins, which are provided with friction-rollers $d\ d$. These rollers strike against the screw-thread upon the collar G, when it is desirable to communicate motion from the wheel to shaft F, and cause said shaft to revolve. J represents a lever, which has a long slot in it near its centre, through which a pin passes, to connect it to the inclined platform B. One end of this lever is pivoted to the upper face of the wheel I, near its periphery, while the other end is provided with a sickle-blade or knife, L. A little above the knife L, and secured to the lever J, is a hook, M, which is used for drawing the lower end of the cornstalks toward the platform, which receives them after they have fallen. K represents a curved metallic shield, which passes up from the frame A and over the platform B, forming not only a cover for said platform, but a guide for the stalks after they are cut, directing them to the bed S. S represents a concave bed, which is pivoted in the frame A, and longitudinally of it. The pivots are in the end of the bed, so that it turns to one side. A rod, $u$, is secured to this bed at one end, and near the driver's seat R, by means of which the said bed is turned for the purpose of emptying the stalks. A shaft, T, which is provided with a series of curved teeth. This shaft lies close to the shield K, with the outer ends of its teeth resting upon the bed S, and answers a double purpose—to guide the stalks to the centre of the bed, and then, when the bed is turned up, to discharge the stalks. The teeth close the opening between the bed and the shield, to keep the stalks from falling through said opening. N represents a standard, which is erected upon the platform B, and which has upon its upper end a reel, O. A band passes from a pulley, $a$, upon the hub of wheel H, to a pulley upon the reel-shaft, for the purpose of giving motion to said reel. The shafts Q of this machine are secured to the frame A, near its forward end, but in advance of the points where it is secured, two standards, P P, are erected. A rod runs through these standards, and also through the shafts, for the purpose of holding them at any desired position. The standards are graduated with holes for this rod, so that the forward end of the machine can be raised or lowered (for cutting higher or lower) by simply shifting the rod.

This machine can be used for cutting corn or cotton, or other similar stalks, whether they are in drills or check-rows. The knife has sufficient sweep, by its mode of connection and operation, to catch all of the stalks in a given circumference. The stalks are drawn and cut against a knife or cutting-edge, $x$, upon the lower or forward end of the platform B. When the stalks are cut off, the reel throws their upper ends, while the hook M draws in their lower ends, so that they fall upon the shield K, and are thence guided by the form of the shield and the rack T to the concave bed S. When the bed is partially turned, the stalks which have been collected upon it are thrown down lengthwise of the row, and beneath the machine. The operator in the seat R turns the platform as often as sufficient stalks are collected.

Having thus fully described my invention, what I claim as new, and desire to secure by Letters Patent, is—

1. The lever J, constructed as described, and used in combination with the inclined platform and the wheel I, and having a sickle-knife upon its lower end, substantially as represented.

2. The hook M, in combination with lever J and knife L, as and for the purpose set forth.

3. The concave bed S, pivoted in the frame, and used with the shield K and rack T, as and for the purpose set forth.

4. The rack T, when used as and for the purpose specified.

In testimony that I claim the foregoing, I have hereunto set my hand, this 7th day of December, 1867.

JEROME B. SWEETLAND.

Witnesses:
A. W. BURTT,
J. D. HOLMES.